UNITED STATES PATENT OFFICE.

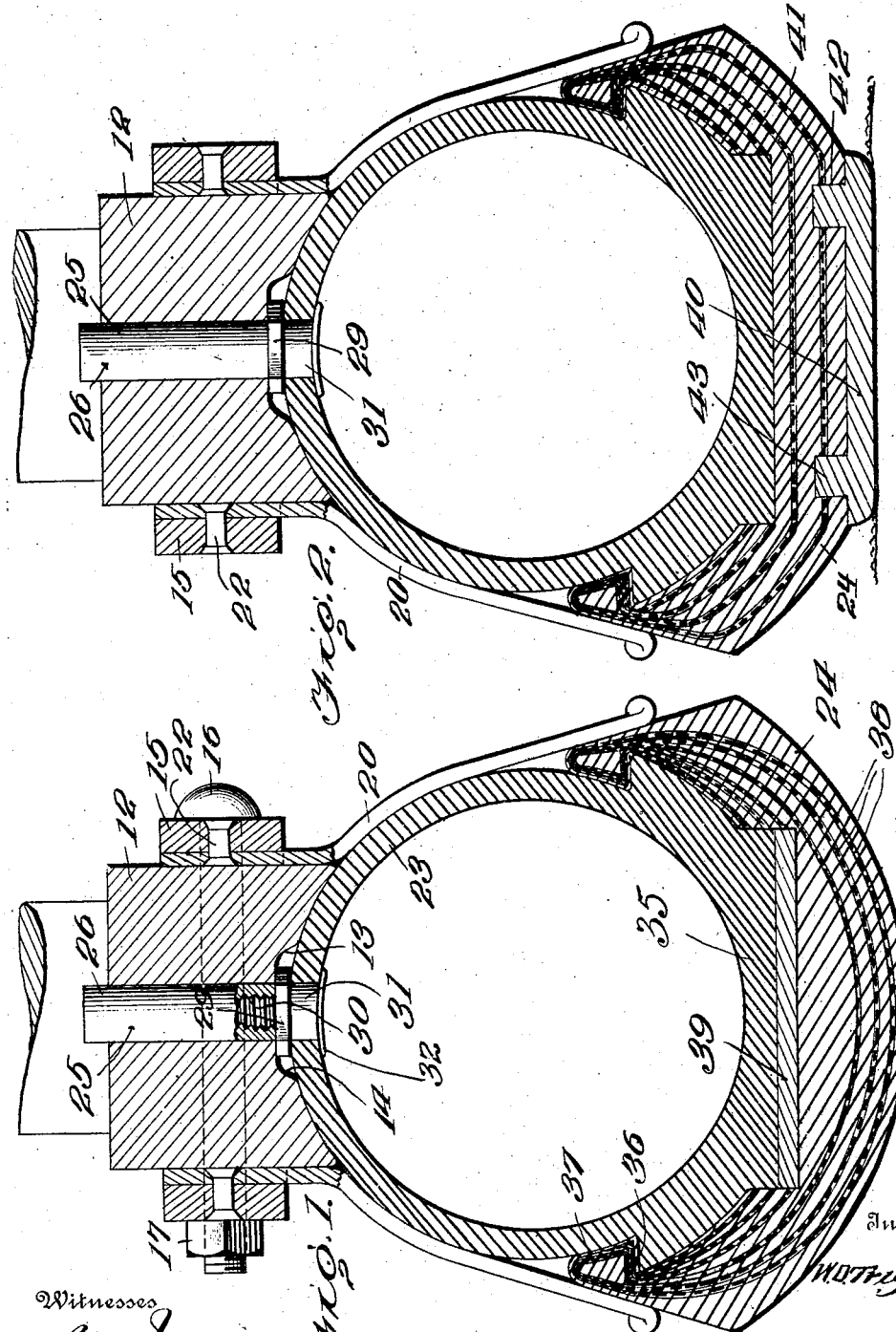

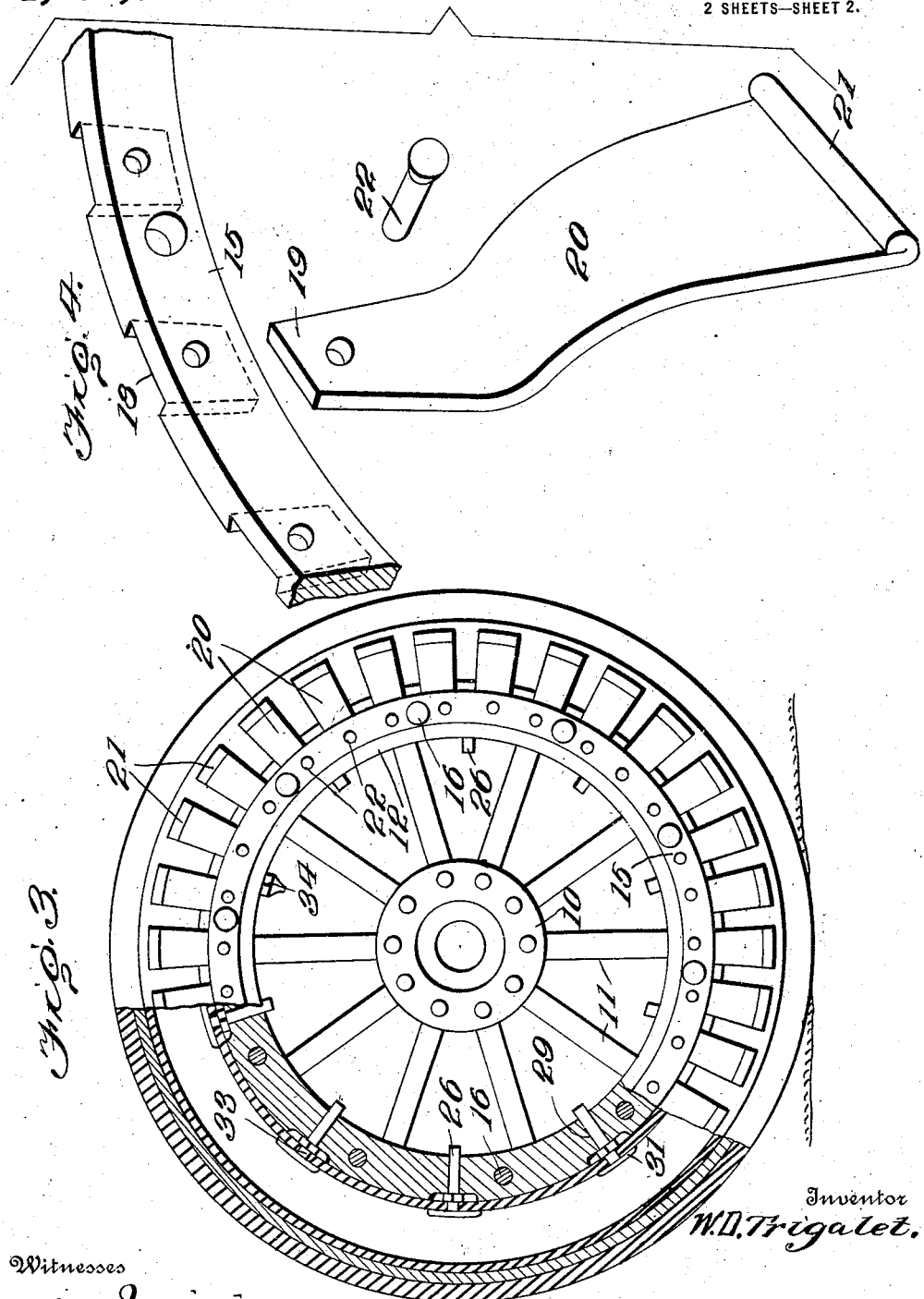

WALTER D. TRIGALET, OF MAMARONECK, NEW YORK.

TIRE CONSTRUCTION.

1,140,778.  Specification of Letters Patent.  Patented May 25, 1915.

Continuation of application Serial No. 786,984, filed August 27, 1913. This application filed December 17, 1913. Serial No. 807,270.

*To all whom it may concern:*

Be it known that I, WALTER D. TRIGALET, citizen of the United States, residing at Mamaroneck, in the county of Westchester and State of New York, have invented certain new and useful Improvements in Tire Construction, of which the following is a specification.

My present invention relates to pneumatic tires, being a continuation of my copending application filed August 27, 1913 and bearing the serial No. 786,984.

The primary object of this invention is the provision of a pneumatic tire which will replace the inner tube and casing now in use and which will eliminate punctures, blowouts and rim cutting.

A still further object of my invention is to construct a pneumatic tire including a tire proper and a resilient tread detachable from the tire and normally held in place by inflation of the tire. In this connection, I provide a metallic shield or guard which may be interposed either between the tire proper and its tread or which may surround the tread as preferred, this shield absolutely preventing puncturing of the tire.

A still further object of my invention is to construct a tire having a detachable tread in which the tire and tread are so constructed as to afford a relatively wide peripheral bearing face for the tire in proportion to the actual diameter of the pneumatic tire proper.

With these and other objects in view, my invention will be more fully described, illustrated in the accompanying drawings, and then specifically pointed out in the claims which are attached to and form a part of this application.

In the drawings:—Figure 1 is a radial sectional view taken through my improved tire and one of the fastening devices employed in preventing longitudinal creeping of the tire; Fig. 2 is a similar view, showing a modified form of tire construction; Fig. 3 is a fragmentary elevational view of a wheel equipped with my improved pneumatic tire, a portion of the wheel and tire being shown in section; Fig. 4 is a fragmentary perspective view of a portion of the rim structure of the wheel, showing the parts unassembled.

Corresponding and like parts are referred to in the following description and indicated in all the views of the drawings by the same reference characters.

To insure a clear understanding of the construction and employment of my pneumatic tire, I illustrate the same in conjunction with a vehicle wheel peculiarly adapted for its use. This wheel is of the artillery type including a hub 10, spokes 11 and rim 12. The rim is provided with a peripheral groove 13 rounded transversely to properly seat the tire and provided at spaced intervals with recesses 14, the purpose of which will be explained.

Rings 15 are secured to opposite sides of the rim by a plurality of bolts 16 and nuts 17. These rings have a plurality of spaced, squared sockets or recesses 18 formed in their inner faces to seat the narrower ends 19 of a plurality of guard springs 20. These guard springs have their outer ends bent into a bead 21 to prevent injury to the tire, the springs being bowed intermediate their length to properly receive the tire when the latter is in position upon the wheel rim.

As the above described wheel structure comprises the subject matter of my copending application, any further detailed description of the same is unnecessary.

Referring more specifically to the pneumatic tire construction, which is best shown in Fig. 2 of the drawing, it will be seen that the tire consists primarily of a pneumatic tube 23 and a tread or shoe 24. The walls of the tube 23 are considerably thicker than those of the usual inner tube for pneumatic tires, being preferably built up much after the manner of the usual pneumatic tire casing or bicycle tube from canvas or other suitable fabric embedded in vulcanized rubber. While I believe it not necessary to provide against longitudinal creeping of said tire about the rim I provide a plurality of anchoring studs 25. Each of these anchoring studs includes a shank or body portion proper 26 provided at its inner end with an encircling shoulder 29 and a centrally formed, internally threaded socket 30. These studs extend through the rims with their inner ends seating in the recesses 14 thereof and the tube 23 is secured to the studs by locking screws 31 having heads 32 shaped to engage against the inner face of the tube and a threaded shank 33 to seat in the socket 30 and thus clamp the tube between the head 32 and shoulder 29. The tube is also provided with the customary valve 34 by means of which it may be inflated.

The pneumatic tube 23 is further thickened at its outer periphery to provide a circumferential tread engaging shoulder 35 having a transversely extended face and at either side to provide laterally directed circumferential shoulders 36 for locking engagement with locking beads 37 formed upon the edges of the tread or shoe 24. This tread or shoe is built up much after the manner of the usual pneumatic tire casing from canvas or other suitable fabric embedded in vulcanized rubber, the strips of canvas or fabric 38 having their edge portions folded upon themselves to provide the retaining beads 37. The inner face of this tread is shaped to engage about the shoulder 35 and in order to insure the tube against punctures a relatively thin shield 39, of resilient metal, is interposed between the tread and the shoulder 35. The tube, tread and springs are so proportioned and arranged that the interlocking shoulders and beads 36 and 37 of the tube and tread line within the outer edge portions of the springs and the springs thereby assist in preventing disengagement of said parts.

In Fig. 2 of the drawings, I have shown a slightly modified form of construction which is practically identical with that previously described with the exception that the interposed shield 39 is omitted and replaced by an outer shield 40 formed of resilient metal and disposed about the outer periphery of the tread 41. This tread is similar in construction to the tread 24, but is provided at spaced intervals with sockets 42 formed in oppositely disposed pairs and adapted to receive inwardly directed studs 43 formed upon the inner face of the shield 40. This construction provides a metallic armor or tread plate for the tire, while the seating of the studs 43 in the sockets 42 of the tread prevents any independent movement of creeping of the shield with respect to the tire.

In applying my pneumatic tire, the tube 23 is positioned upon the rim while deflated, the locking studs 31 being preferably passed into the inner ends of the bores of the rim and the studs 25 then passed outwardly through the rim and threaded into place. With the form of tire shown in Fig. 1, the shield 39 is then placed within the tread 24 and the latter positioned about the tire which in the meantime has been partially filled with air. The rings 15, together with their springs, are then fastened in place upon either side of the tire, after which the tire is fully inflated. This inflation of the tire forces the same against the springs and insures a positive locking engagement between the shoulders 36 and beads 37 of the tube and shoe, respectively.

In the form of tire shown in Fig. 2, the assembling is the same with the exception that the metallic shield body is positioned about the tread before the same is applied to the partially inflated tube.

The above described tire is practically blow-out proof, as blow-outs are generally due to excessive flexing or distortion of the tire casing causing folds or cracks in the fabric and consequent weak spots. The metallic shields employed in connection with my tire prevent such flexing or distortion of the fabric and, consequently, prevent the formation of folds therein and weakening of the tread. The reinforcing springs protect the tire to a great extent from injury from the side such as might be caused by stones or raised trolley tracks and the like and absolutely prevent displacement of the tire from the wheel. The tread of my tire protects the pneumatic tube from wear and tear, serves either to inclose the metallic shield or as an anchor for the shield and gives a greater width of bearing surface for the wheel.

The metallic shield 39 is preferably made in the form of a split ring having beveled overlapping ends in order to permit longitudinal expansion on and with the tube when inflating the same. To prevent binding between the tube and this shield, the shield may be coated internally with some lubricating oil including graphite in its composition.

As shown in Figs. 1 and 2, the plies of canvas which stiffen and reinforce the tread of the tire, after being brought together and doubled upon themselves to form the locking beads, have their free edge portions again separated to properly reinforce the shoulders of the tread which engage against the shoulders of the pneumatic tire or tube. The peripheral edges of the tread are inclined inwardly radially in such a manner that the locking bead portions of the tire seat within the spring or guard arms of the rim, while at the same time the peripheral outer face of the tread may be constructed much wider than the diameter of the tire or pneumatic tube proper. Because of this the tire is peculiarly adapted for use upon heavily built vehicles or vehicles carrying heavy loads. Furthermore, the extended edge portions of the tread protect the main body of the tread and greatly prolong the life of the tire. As a matter of fact, the tread portion is usually thickened exteriorly adjacent its peripheral edges, whereby its side faces extend tangentially toward the intermediate portions of the side faces of the tube.

Although I have illustrated and described a pneumatic tire construction in all its details, it will, of course, be understood that I do not wish to limit myself to the specific details set forth, as various minor changes, within the scope of the appended claims, may be made at any time, if desired, without in the slightest degree departing from the spirit of my invention.

Having thus described the invention, what is claimed as new is:

1. A tire construction including a pneumatic tube thickened to provide a tread portion having circumferential shoulders and to provide circumferential locking ribs spaced from the shoulders, and a separable tread provided at its free edges with inwardly directed circumferential locking beads for engagement with the locking ribs of the tube and cut-away interiorly to provide shoulders engaging the shoulders of the tube, said tread being reinforced by a plurality of fabric layers, the peripheral edges of which are extended into and about the beads and then separated and extended in spaced relation to additionally reinforce those portions of the tread between the beads and shoulders.

2. A tire construction including a pneumatic tube thickened to provide a tread portion having circumferential shoulders and to provide circumferential locking ribs spaced from the shoulders, and a separable tread provided at its free edges with inwardly directed circumferential locking beads for engagement with the locking ribs of the tube and cut-away interiorly to provide shoulders engaging the shoulders of the tube, the tread portion being thickened exteriorly adjacent its peripheral edges, whereby its side faces extend tangentially toward the intermediate portions of the side faces of the tube.

In testimony whereof I affix my signature in presence of two witnesses.

WALTER D. TRIGALET. [L. S.]

Witnesses:
ALBERT G. NURENBERG,
WALTER H. SWIFT.

Copies of this patent may be obtained for five cents each, by addressing the "Commissioner of Patents, Washington, D. C."